United States Patent [19]

Qureshi et al.

[11] Patent Number: 5,244,719
[45] Date of Patent: Sep. 14, 1993

[54] PREPREG WITH IMPROVED ROOM TEMPERATURE STORAGE STABILITY

[75] Inventors: Shahid P. Qureshi, Alpharetta; Hugh C. Gardner, Roswell, both of Ga.

[73] Assignee: Amoco Corporation, Chicago, Ill.

[21] Appl. No.: 601,901

[22] Filed: Oct. 23, 1990

[51] Int. Cl.$^5$ .................. B32B 9/00; B32B 7/00; C08L 63/00

[52] U.S. Cl. .................. 428/245; 428/283; 428/288; 428/290; 428/294; 428/408; 523/468

[58] Field of Search .................. 528/97, 99, 172; 525/526, 423; 523/457, 458, 468; 428/408, 245, 283, 288, 290, 294

[56] References Cited

U.S. PATENT DOCUMENTS

| | | | |
|---|---|---|---|
| 4,579,885 | 4/1986 | Domeier et al. | 523/457 |
| 4,593,056 | 6/1986 | Qureshi et al. | 523/457 |
| 4,607,069 | 8/1986 | Tesch et al. | 525/423 |
| 4,608,404 | 8/1986 | Gardner et al. | 523/458 |
| 4,764,571 | 8/1988 | Namba et al. | 528/97 |
| 4,863,787 | 9/1989 | Gawin | 428/240 |
| 4,940,740 | 7/1990 | Folda et al | 523/428 |

FOREIGN PATENT DOCUMENTS

| | | |
|---|---|---|
| 0274899 | 7/1988 | European Pat. Off. . |
| 0351025 | 1/1990 | European Pat. Off. . |
| 8502184 | 5/1985 | World Int. Prop. O. . |

*Primary Examiner*—George F. Lesmes
*Assistant Examiner*—James D. Withers
*Attorney, Agent, or Firm*—Richard J. Schlott; Stephen L. Hensley; Frank J. Sroka

[57] ABSTRACT

Prepreg comprising structural fiber and matrix resin formulated from epoxys selected from the group consisting of polyglycidyl ethers of polycyclic bridged hydroxy-substituted polyaromatic compounds and N,N,N',N'-tetraglycidyl-bis(4-amino-3-ethylphenyl) methane with from about 6 to about 150 pbw, per hundred parts by weight of the epoxy resin components, of a solid aromatic diamine hardener insoluble in said composition in an amount effective to cure said epoxy resin exhibiting improved storage stability characteristics at room temperature.

9 Claims, No Drawings

PREPREG WITH IMPROVED ROOM TEMPERATURE STORAGE STABILITY

BACKGROUND OF THE INVENTION

This invention relates to fiber-reinforced composites, and more particularly to prepreg having improved storage stability comprising an epoxy matrix resin formulation, and to composites manufactured therefrom.

Fiber-reinforced composites are high strength, high modulus materials which are finding wide acceptance for use in sporting goods and in producing consumer items such as appliances. Composites are also finding increased acceptability for use as structural components in automotive applications, as components of buildings and in aircraft. When used in structural applications the composites are typically formed of continuous fiber filaments or woven cloth embedded in a thermosetting or thermoplastic matrix. Such composites may exhibit considerable strength and stiffness, and the potential for obtaining significant weight savings makes them highly attractive for use as a metal replacement.

The composites industry has long been involved in finding ways to further improve the mechanical properties of composite materials used in structural applications. Considerable effort has been expended over the past two decades directed toward the development of composites with improved fracture toughness. Inasmuch as most of the commonly employed matrix resins, as well as many of the reinforcing fibers, are generally brittle, much of that effort has gone into a search for components having better toughness characteristics. As a consequence, the search for toughened matrix resins has become the subject of numerous recent patents and publications, and numerous formulations have been made available to the composite industry through these efforts. Although the addition of rubber, thermoplastics and the like generally improves the ductility and impact resistance of neat resins, the effect on the resulting composites is not necessarily beneficial. In many instances the increase in composite toughness may be only marginal, and a reduction in high temperature properties and in resistance to environmental extremes such as exposure to water at elevated temperatures is frequently seen.

Most advanced composites are fabricated from prepreg, a ready-to-mold sheet of reinforcement impregnated with uncured or partly cured matrix resin. In order to be useful in commercial fabrication operations, prepreg needs to have a long out-time, defined as the period of time the prepreg can remain at room temperature and still be useful for making composites. For use in layups with complex contours the prepreg also must be pliable, and remain pliable in storage. Preferably the prepreg surface will also have and retain good tack. Pliability in prepreg is conferred by the matrix, which should remain soft and deformable to avoid cracking during fabrication.

The matrix resins most widely used for such prepreg systems are epoxy-based formulations, and many comprise an epoxy resin and aromatic amine hardener. The aromatic diamine hardener preferred for a wide variety of commercial applications has been 4,4'-diaminodiphenyl sulfone (DDS). DDS has a low level of reactivity with epoxy resin at room temperature, and prepreg made using DDS-based epoxy resin formulations generally has the desired long out-times. However, most epoxy matrix resin formulations based on DDS require further modification to overcome the low toughness that is characteristic of composites made from these resin formulations.

The isomeric form of DDS, 3,3'-diaminodiphenyl sulfone or 3,3'-DDS, is known in the art to be an effective hardener for epoxy resins. The reactivity of 3,3'-DDS is generally greater than DDS, and epoxy formulations based on this diamine generally have very short shelf life due to the greater reactivity. Although composites made from epoxy formulations based on 3,3'-DDS are known to exhibit improved toughness, the shorter shelf life makes the manufacture of useful prepreg from such formulations a much more difficult task. Alternative diamines having lower reactivities, as well as a variety of cure inhibitors for use in slowing the cure rate of these highly reactive systems, have also become available to formulators of matrix resins, and some of these have found acceptance in the art. In order to produce fully-cured composites and attain the maximum possible toughness and resistance to environmental attack, many slow-cure systems require extended curing cycles and post-curing operations, and often require temperatures well above the 350° F. curing temperature ordinarily preferred by the composite fabricating art. Such formulations are not preferred by fabricators, and have not been well-accepted.

The prepreg based on epoxy resin formulations presently available to the fabricator for producing toughened composites thus require further improvement. Prepreg with extended shelf life and out-times would permit better handling and more practical storage. If the storage-stable prepreg could be used in conventional fabricating operations with 350° F. curing cycles to produce fully-cured toughened composites, they would represent a useful advance in the art and could find rapid acceptance by resin formulators and composite manufacturers.

SUMMARY OF THE INVENTION

The present invention is directed to prepreg having excellent storage stability which readily cures at 350° F. More particularly, the invention is directed to prepreg comprising structural fiber and epoxy resin formulations having improved room temperature storage stability and to composites fabricated from such prepreg.

The prepreg of this invention have excellent tack and exhibit the highly unexpected property of retaining tack unchanged for weeks when stored at room temperature, even though the formulation becomes fully cured when conventional processing and curing cycles at 350° F. are used. The resulting composite structures are also capable of improved toughness.

DETAILED DESCRIPTION

The prepreg according to this invention comprise structural fiber and an epoxy-based matrix resin formulation.

The matrix resin formulations useful in forming prepreg in the practice of this invention comprise certain epoxy resins having dispersed therein a solid aromatic diamine hardener which is at room temperature insoluble in an amount effective to cure the resin formulation, and which at least partially dissolves when heated to a temperature at or near the processing temperature employed for curing the prepreg. By room temperature is meant a non-critical range of temperatures normally encountered in work spaces employed for fabrication of composites, generally estimated to be in the range of from about 50° to about 110° F. Conventional cure temperatures used in the manufacture of composites will be understood to lie in the range of from 300° to 370° F., preferably 325° to 360° F., and still more preferably will be at or near a temperature of about 350° F.

The diamine hardener will be selected to have no significant solubility in the epoxy resin component at room temperature, and to dissolve at least partially at a temperature near the cure temperature contemplated for processing prepreg made from the formulation. When the formulation is heated to the processing temperature the diamine hardener will become partly dissolved and will then be present in solution as a highly reactive hardener for the epoxy resin component, providing fully-cured, substantially homogeneous resin using conventional or even shortened curing cycles. Although the particular aromatic diamine selected for use as a hardener will thus depend upon the specific epoxy resin component of the formulation, diamines shown to be useful with the particular epoxy resins described for use in the practice of this invention include 3,3'-diaminodiphenyl sulfone and 4,4'-bis(4-aminophenoxy) diphenyl sulfone. The preferred diamine for use with the specific epoxy resins employed in the practice of this invention will be 3,3'-diaminodiphenyl sulfone.

The epoxy resin component for use in the matrix resin formulations of this invention will be selected from epoxy resins in which the diamine hardener, preferably 3,3'-diaminodiphenyl sulfone, remains substantially undissolved after long periods at room temperature. The preferred epoxy resins are selected from the group consisting of polyglycidyl ethers of polycyclic bridged hydroxy-substituted polyaromatic compounds and N,N,N',N'-tetraglycidyl-bis(4-amino-3-ethylphenyl) methane, as well as mixtures thereof. The polyglycidyl ethers of polycyclic bridged hydroxy-substituted polyaromatic compounds may be further represented by the structural formula:

WO 85/02184. One such epoxy resin is available from Dow Chemical Company under the tradename Tactix 556.

The tetraglycidyl epoxy resin set forth above can be readily obtained by conventional processes from the corresponding diamine. Such tetraglycidyl epoxy resins are available commercially in the form of mixtures. For example, one such commercial epoxy resin is available in the form of a mixture that comprises about 40 mole % N,N,N',N'-tetraglycidyl-bis(4-amino-3-ethylphenyl) methane, about 47 mole % (4-diglycidylamino-3-ethylphenyl)-(4-diglycidylamino-phenyl) methane, and about 12 mole % N,N,N',N'-tetraglycidyl-bis(4-aminophenyl) methane, and is available from Ciba-Geigy. An alternative form is also available from the same source as XUMY-722, which comprises substantially N,N,N',N'-tetraglycidyl-bis(4-amino-3-ethylphenyl) methane, represented by the structure

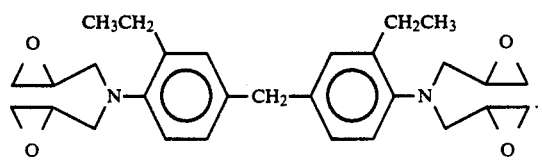

Although the particular epoxy resins specified to be useful in the practice of this invention are dissimilar in structure, the resins have in common the characteristics that the aromatic diamine selected as the diamine hardener, preferably 3,3'-diaminodiphenyl sulfone, will be insoluble therein at room temperature and form a substantially inhomogeneous mixture when the epoxy and the pulverized solid diamine are mixed and held at room temperature. The aforesaid mixtures form a substantially homogeneous solution when heated to the elevated temperatures employed for curing these resin formulations.

Suitable epoxy resin formulations may be prepared according to methods and practices well known and

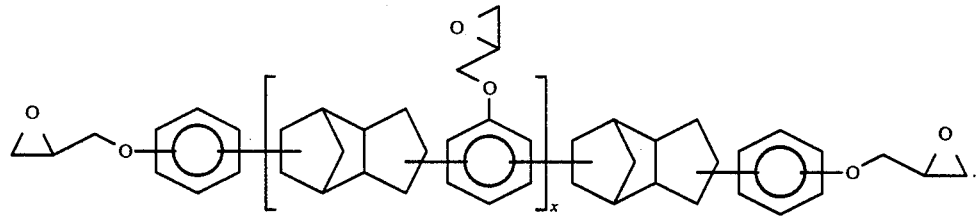

The epoxy resin of the structural formula will ordinarily be a mixture of compounds, and the value of x, which will lie in the range of from 0 to about 5, will therefore ordinarily be an average value for the mixture, rather than an integer.

It will be understood that the aforesaid polyglycidyl ethers are oligomeric materials obtained by conventional and well-known methods for the production of epoxide resins such as, for example, by reaction of the corresponding polycyclic bridged hydroxy-substituted polyaromatic compound with epichlorihydrin. The precursor polycyclic bridged hydroxy-substituted polyaromatic compound may in turn be obtained by a polyalkylation of a phenol with an unsaturated polycyclic aliphatic compound such as dicyclopentadiene. Such precursors are well-known in the art and have been described, for example, in published PCT application widely used in the resin art. Generally the matric resin formulations will comprise greater than 2 parts by weight (pbw) diamine hardener per hundred parts by weight epoxy resin. Although the particular level of hardener selected will depend in part upon the particular epoxy and diamine employed and the stoichiometric ratio needed to accomplish the degree of crosslinking desired for the envisioned end use, preferably at least 3 pbw and more preferably from about 6 to about 150 pbw diamine hardener per hundred pbw epoxy resin will be used. The amount of each component selected will depend upon the molecular weights of the individual components and the molar ratio of reactive amine (N-H) groups to epoxy groups desired in the final matrix resin system. For most prepreg and composite applications, sufficient diamine hardener will be used to provide a molar ratio of N-H groups to epoxide groups in the range of from about 0.3:1 to 1.8:1, preferably from 0.4:1 to 1.3:1.

The formulations may further include a thermoplastic polymer to impart improved toughness to the resulting composite by increasing the ductility and impact resistance of the cured resin formulation. When dissolved in the formulation prior to curing, thermoplastics may also increase the viscosity and film strength of the uncured resin, thereby improving the resin processability for use in impregnating operations, and can provide prepreg with better handling characteristics for use in composite manufacture. A variety of thermoplastics are known in the art for use in combination with epoxy resins, including for example polyaryl ethers such as polyaryl sulfones and polyaryl ether sulfones, polyether ketones, polyphenylene ethers and the like, as well as polyarylates, polyamides, polyamide-imides, polyether-imides, polycarbonates, phenoxy resins and the like. Where the purpose for including the thermoplastic is to improve the viscosity, processability and handling characteristics, the thermoplastic selected will necessarily be soluble in the uncured epoxy resin formulation. It will be recognized, however, that thermoplastics that increase the room temperature solubility of the selected diamine hardener in the epoxy formulation are to be avoided. The proportion of thermoplastic employed will depend in part upon the thermoplastic selected and the particular end use envisioned. However, for most purposes, where a thermoplastic is employed the formulation will comprise greater than 1 wt %, preferably from about 5 to about 30 wt %, of the combined weight of diamine hardener and epoxy resin components, i.e. from 5 to about 30 pbw per hundred pbw of combined hardener and epoxy resin components.

The epoxy formulations may additionally include an accelerator to increase the cure rate when the formulation is heated to prepreg processing temperatures. The accelerators will be selected from among those widely known and used in the epoxy resin formulating art and may be employed in conventional amounts. Accelerators which may be found effective for these purposes include Lewis acid:amine complexes such as $BF_3$:monoethylamine, $BF_3$:triethanolamine, $BF_3$:piperidine and $BF_3$:2-methylimidazole; amines such as imidazole, 1-methyl imidazole, 2-methyl imidazole, N,N-dimethylbenzylamine and the like; acid salts of tertiary amines such as the p-toluene sulfonic acid:imidazole complex and the like, salts of trifluoromethane sulfonic acid such as FC-520 (obtained from 3-M Company), organophosphonium halides, dicyandiamide, 4,4'-methylene bis(phenyl-dimethyl urea) and 1,1-dimethyl-3-phenyl urea. Mixtures of such accelerators may also be employed. For some applications it may also be desirable to include dyes, pigments, stabilizers, thixotropic agents and the like, and these and other additives may be included as needed at levels commonly practiced in the composite art. Upon curing, the resin formulations, exclusive of any particulate additives, fillers and reinforcement which may be employed, will form a substantially single, continuous rigid phase.

Composite Fabrication

When used to fabricate composites, the matrix resin formulation will be first combined with continuous fiber reinforcement or structural fibers and formed into a prepreg prior to curing. Suitable structural fiber may be characterized in general terms as having a tensile strength of greater than 100 kpsi and a tensile modulus of greater than two million psi. Fibers useful for these purposes include carbon or graphite fibers, glass fibers and fibers formed of silicon carbide, alumina, titania, boron and the like, as well as fibers formed from organic polymers such as, for example, polyolefins, poly(benzothiazole), poly(benzimidazole), polyarylates, poly(benzoxazole), aromatic polyamides, polyaryl ethers and the like, and may include mixtures comprising two or more such fibers. Preferably the fibers will be selected from glass fibers, carbon fibers and aromatic polyamide fibers such as the fibers sold by the DuPont Company under the trade name Kevlar. The fibers may be used in the form of continuous tows of typically from 500 to 420,00 filaments, as continuous unidirectional tape or as-woven cloth. Carbon fiber will be preferred for most composite applications.

The toughness of composite materials may be improved by incorporating rigid particles into the matrix resin component according to methods and processes recently disclosed in the art. In general terms, the particles useful in forming toughened composites by such processes comprise a finely-divided, rigid material, and may be solid or hollow and take any convenient shape. The particles may, for example, be formed by conventional processes into bead-like spheres or oblate spheroids, or produced by pulverizing or grinding a rigid material such as a metal or ceramic or a suitably hard and rigid resin to provide particles rough and irregular in shape. Short fibers, flock, fiber pulp, fibrils and the like, and flake-like particles may also be used in the practice of this invention. Where the particles will be dispersed in the matrix resin formulation and then applied to the fiber reinforcement or prepreg, the particles will necessarily be formed of a material selected to be substantially insoluble in the matrix resin formulation prior to gelation. In order to be useful, the particles will necessarily have adequate rigidity. Soft or rubbery resin alloys or blends having glass transition temperatures below about 15° C. or hardness values below about D-50 (Shore), and those having a melt temperature substantially below the expected processing temperature, may melt or significantly soften during composite fabrication and thus will not be suited for use as particles.

The prepreg of this invention, and the composites made therefrom, will comprise from about 20 to about 80 wt % continuous fiber, based on final composite weight embedded in the matrix resin component of the composite. The matrix resin component may optionally include particulate modifiers, and such particle modifiers may thus be present in an amount of from 0 up to about 25 wt % of the combined weight of the particles and the matrix resin formulation.

Methods well known and ordinarily widely used in the composite art for the production of layered compositions may be readily adapted for fabricating the prepreg. Most commonly, the prepreg comprises an impregnated tape comprising uniformly disposed, parallel filaments of continuous fiber or may comprise resin-impregnated fabric woven from continuous fiber tow. These impregnated fiber structures, designated prepreg, may be produced by impregnating tape or fabric with matrix resin formulation in an uncured state using any convenient method conventionally employed in the art including melt coating, calendaring, dip impregnation with a resin solution or molten resin, melt pressing the tape or fabric into a film of the matrix resin or the like.

The composite will then be formed by laying up sheets or tapes of the prepreg to form a layered stack or lay-up, and curing the lay-up, usually with heat and under pressure. The prepreg layers, each comprising continuous fiber and matrix resin in uncured form, will have their adjoining surfaces adhered upon curing to form a single structure having discrete layers of continuous fiber embedded in an essentially continuous and substantially homogeneous matrix resin phase.

Where the composite includes a particulate modifier, it will be necessary to distribute the particles uniformly between each of the prepreg layers. A variety of methods may be used for this purpose, and the placing of particles at a surface of the prepreg may be carried out as a separate step prior to or during the lay-up operation, or integrated into the step of impregnating the tape or woven fabric. The former will be referred to as two-step processes, while the latter are termed one-step processes. Such processes are now well known in the art and have been described for example in published European Patent Applications 0 274,899 and 0 351,025 as well as in U.S. Pat. No. 4,863,787; the teachings of these references are hereby incorporated by reference.

The invention will be better understood by consideration of the following Examples, which are provided by way of illustration of the invention and are not intended to be limiting thereof. In the Examples, all parts are by weight, and all temperatures are given in Centigrade unless otherwise noted.

EXAMPLES

The following materials and formulations are employed in the Examples.

| | |
|---|---|
| Epoxy-1: | An epoxy resin mixture comprising about 40 mole % N,N,N',N'-tetraglycidyl-bis(4-amino-3-ethylphenyl)methane, about 47 mole % (4-diglycidylamino-3-ethylphenyl)-(4-diglycidylaminophenyl) methane, and about 12 mole % N,N,N',N'-tetraglycidyl-bis(4-aminophenyl) methane. Obtained as RD 87-160 from Ciba-Geigy. |
| Epoxy-2: | N,N,N',N'-tetraglycidyl-bis(4-amino-3-ethylphenyl)methane. Obtained as XUMY-722 from Ciba-Geigy. |
| Tactix 556: | A mixture of oligomeric polyglycidyl ethers of polycyclic bridged hydroxy-substituted polyaromatic compounds. Obtained as Tactix 556 from Dow Chemical Company. |
| EPI-830: | Diglycidyl ether of bisphenol F, obtained as EPI-830 from Dainippon Inc. |
| 3,3'-DDS: | 3,3'-diaminodiphenyl sulfone diamine hardener. Obtained as HT-9719 from Ciba-Geigy. |
| SED-p: | 4,4'-bis(4-aminophenoxy) diphenyl sulfone diamine hardener. Obtained from Wakayama Seika, Japan. Average particle size less than 10 microns, by micropulverization and screening. |
| PES | Polyether sulfone, obtained as Vitrex 200 from ICI, Ltd. |
| PEI | Polyether imide thermoplastic resin, obtained as Ultem 1000 from the General Electric Company |
| Particles | |
| PPO: | Resin particles having median size 12 microns, 100% less than 28 microns, were prepared from poly(2,6-dimethyl phenol), obtained as PPO resin from the General Electric Company. The resin was received in powder form and was classified by screening to provide the following materials. In some instances, the resin particle size was further reduced by milling, impact milling or grinding before screening. |
| Fibers | |
| Carbon Fiber: | Thornel ® T 40 grade carbon fiber from Amoco Performance Products, Inc. This fiber typically has a filament count of 12,000 filaments per tow, a yield of 0.44 g/m, a tensile strength of 810 kpsi, a tensile modulus of 42 mpsi and a density of 1.81 g/cc. |

In the Examples, ribbon formed from the fiber was used to prepare prepreg having fiber areal weights of 140 to 150 g/m$^2$.

Test Procedures

Compression After Impact Test (CAI). This procedure, referred to as the Compression After Impact test or CAI, is generally regarded as a standard test method in the industry. The test specimens are panels measuring 6×4 in., cut from 32 ply fiber-reinforced composite sheets. The panels are first impacted by being subjected to an impact of 1500 in-lbs/in at the center in a Gardner Impact Tester, using a 5/8 in. diameter indenter; a panel thickness of 0.177 in. was assumed. The impacted panel is then placed in a jig and tested edgewise for residual compressive strength. The details are further described in "NASA Contractor Report 159293", NASA, August, 1980.

The methods of the following Examples are representative of those that may be employed for preparing the resin formulations, prepreg and composites useful in the practice of this invention. The processes will be generally recognized by those skilled in the art as processes and methods commonly employed for the production of thermoset resin formulations and composites.

EXAMPLE 1

Epoxy-1 epoxy resin, 63 g, was placed in a 250 ml flask and heated to 100° C. before adding 21 g of powdered 3,3'-DDS. The mixture was stirred for 10 min. to thoroughly disperse the diamine, giving a non-homogeneous mixture with suspended solid diamine dispersed throughout. A portion of the mixture was then poured into a pre-heated tensile specimen casting apparatus. The cast tensile specimens, after cooling, were examined and found to comprise an inhomogeneous mixture having diamine solids dispersed throughout.

A tensile specimen was cured by heating to 350° F. over a two hour period, holding at that temperature for two hours, and then cooling to room temperature over a one hour period. The cured casting was homogeneous and one-phase, and fully cured at the end of the two hour cure cycle.

The resin mixture had a gel time of 33 minutes, determined at 350° F. using a Fisher-Johns melting point apparatus, and was very tacky. The cast resin films stored at room temperature remained tacky after a period of 45 days.

EXAMPLE 2

A mixture of 50 g of Epoxy-1 epoxy resin and 50 g of Tactix 556 epoxy resin was placed in a 250 ml flask and heated to 110° C. before adding 27 g of powdered 3,3'-DDS. The mixture was stirred for 5 min. to thoroughly disperse the diamine, then degassed for five minutes to give a non-homogeneous mixture with suspended solid diamine dispersed throughout. A portion of the mixture was then poured into a pre-heated tensile specimen casting apparatus. The cast tensile specimens, after cooling, were examined and found to comprise an inhomogeneous mixture having diamine solids dispersed throughout.

The resin mixture had a gel time of 24 minutes at 350° F., and was very tacky. The cast resin films stored at room temperature showed no change in tack after a period of 20 days.

A tensile specimen was cured by heating to 350° F. over a three hour period, holding at that temperature for two hours, and then cooling to room temperature over a one hour period. The cured casting was homogeneous and one-phase, and fully cured at the end of the two hour cure cycle.

EXAMPLE 3

A mixture of 27 g of Epoxy-1 epoxy resin and 87 g of Tactix 556 epoxy resin was placed in a 250 ml flask and heated to 110° C. before adding 24 g of powdered 3,3'-DDS. The mixture was stirred for 5 min. to thoroughly disperse the diamine, then degassed for five minutes to give a non-homogeneous mixture with suspended solid diamine dispersed throughout. A portion of the mixture was then poured into a pre-heated tensile specimen casting apparatus. The cast tensile specimens, after cooling, were examined and found to comprise an inhomogeneous mixture having diamine solids dispersed throughout.

The resin mixture had a gel time of 25 minutes at 350° F., and was very tacky. The cast resin films stored at room temperature showed no change in tack after a period of 20 days.

A tensile specimen was cured by heating to 350° F. over a three hour period, holding at that temperature for two hours, and then cooling to room temperature over a one hour period. The cured casting was homogeneous and one-phase, and fully cured at the end of the two hour cure cycle.

EXAMPLE 4

Epoxy-1 epoxy resin, 75 g, was placed in a 250 ml flask and heated to 135° C. before adding 20 g of powdered PES thermoplastic. The mixture was stirred 10 min before cooling to 110° C. and then adding 55.5 g of 3,3'-DDS. The mixture was stirred for 5 min. at 110° C. to thoroughly disperse the diamine, then degassed for twelve minutes to give a non-homogeneous mixture with suspended solid diamine dispersed throughout. A portion of the mixture was then poured into a pre-heated tensile specimen casting apparatus. The cast tensile specimens, after cooling, were examined and found to comprise an inhomogeneous mixture having diamine solids dispersed throughout.

The resin mixture had a gel time of 16 minutes at 350° F., and was tacky. The cast resin films stored at room temperature showed no change in tack after a period of 30 days.

A tensile specimen was cured by heating to 350° F. (177° C.) over a three hour period, holding at that temperature for two hours, and then cooling to room temperature over a one hour period. The cured casting was homogeneous and one-phase, and fully cured at the end of the two hour cure cycle. The glass transition temperature (Tg) for the neat resin was 208° C., while after immersion in boiling water for 72 hr., the Tg was 185° C.

Example 5

A mixture of 800 g of Tactix epoxy resin and 800 g of Epoxy-1 epoxy resin was placed in a resin flask, followed by a solution of 165 g of PEI thermoplastic dissolved in 500 g of methylene chloride. Solvent was removed by heating and stirring the mixture to 110° C., and then applying vacuum at 110° C. for 30 min., before adding 55.5 g of 3,3'-DDS. The mixture was stirred for 10 min. at 110° C. to thoroughly disperse the diamine, giving a non-homogeneous mixture with suspended solid diamine dispersed throughout.

A portion of the mixture was then poured into a pre-heated tensile specimen casting apparatus. The cast tensile specimens, after curing, were homogeneous.

The resin mixture had a gel time of 25 min. at 350° F. and good tack. Cast resin films stored at room temperature showed no change in tack after a period of 40 days.

A tensile specimen was cured by heating to 350° F. (177° C.) over a three hour period, holding at that temperature for two hours, and then cooling to room temperature over a one hour period. The cured casting was homogeneous and one-phase, and fully cured at the end of the two hour cure cycle. The Tg for the neat resin was 202° C.

Prepreg was prepared by the two-step process using T40 carbon fiber, with PPO modifier particles. Prepreg stored at room temperature remained tacky after a period of 20 days. The resulting composites had a CAI value of 40.7 kpsi.

EXAMPLE 6

A mixture of 34.2 g of Tactix epoxy resin and 34.2 g of Epoxy-2 epoxy resin was placed in a resin flask, followed by a solution of 60 g of PEI thermoplastic dissolved in 50 g of methylene chloride. Solvent was removed by heating and stirring the mixture to 110° C., and then applying vacuum at 110° C. for 30 min., before adding 55.5 g of 3,3'-DDS. The mixture was stirred for 10 min. at 110° C. to thoroughly disperse the diamine, giving a non-homogeneous mixture with suspended solid diamine dispersed throughout.

A portion of the mixture was then poured into a pre-heated tensile specimen casting apparatus. The cast tensile specimens, after curing at 350° F. over a three-hour period, were homogeneous and single phase. The Tg determined for the specimen was 195° C.

The resin mixture had a gel time of 32 min. at 350° F. and good tack. Cast resin films stored at room temperature showed no change in tack after a period of 30 days.

EXAMPLE 7

Epoxy-2 epoxy resin, 63 g, was placed in a 250 ml flask and heated to 110° C. before adding 55 g of SED-p diamine hardener, over a 10 min. period. The mixture was stirred for 15 min. at 110° C. to thoroughly disperse the diamine, giving a non-homogeneous mixture with suspended solid diamine dispersed throughout. A portion of the mixture was then poured into a pre-heated tensile specimen casting apparatus. The cast tensile specimens, after cooling, were examined and found to comprise an opaque solid. The cast tensile specimens were cured by heating to 350° F. and holding at that temperature for two hours, then cooling to room temperature over a one-hour period. The cured castings were transparent and single phase, and had a Tg of 220° C.

The resin mixture had a gel time of 20 minutes at 350° F., and was tacky. The mixture, stored at room temperature, showed no change in tack after a period of 30 days.

CONTROL EXAMPLE A

A mixture of 100 g of Tactix 556 epoxy resin and 35 g of EPI-830 epoxy resin was placed in a 250 ml flask and heated to 105° C. before adding 38 g of powdered 3,3'-DDS. The mixture was stirred for 5 min. to thoroughly disperse the diamine, then degassed for five minutes to give a fully homogeneous solution, with no suspended solid diamine. A portion of the mixture was then poured into a pre-heated tensile specimen casting apparatus. The cast tensile specimens, after cooling, were examined and found to comprise a fully homogeneous mixture with no visible solids.

The resin mixture had a gel time of 17 minutes at 350° F., and was tacky. The cast resin films stored at room temperature were brittle and without tack after a period of 20 days.

A neat resin casting was cured by heating to 350° F. over a three hour period, holding at that temperature for two hours, and then cooling to room temperature over a one hour period. The cured casting was homogeneous and one-phase, and fully cured at the end of the two hour cure cycle.

CONTROL EXAMPLE B

A mixture of 100 g of Tactix 556 epoxy resin and 35 g of Epoxy-1 epoxy resin was placed in a 250 ml flask and heated to 105° C. before adding 42 g of powdered 3,3'-DDS. The mixture was stirred for 105 min. to dissolve the diamine as completely as possible, to give a homogeneous solution, with no significant amount of suspended solid diamine. A portion of the mixture was then poured into a pre-heated tensile specimen casting apparatus. The cast tensile specimens, after cooling, were examined and found to comprise a homogeneous mixture.

The resin mixture had a gel time of 20 minutes at 350° F., and had little tack.

It will be apparent from a consideration of the Control Examples provided for comparison that formulations based on epoxy mixtures in which the diamine hardener is fully dissolved, such as in Control Example A, will exhibit poor storage stability, and the film specimens cure on storing at room temperature, becoming brittle and losing tack. It will also be seen that a resin formulation prepared by heating and stirring for an extended period to dissolve the diamine will have poor tack, as shown by the films of Control Example B having very low tack as made because of the degree of resin cure caused by heating to dissolve the diamine. As demonstrated by Examples 1-7, formulations that are otherwise equivalent formulations wherein the diamine hardener is dispersed as an insoluble solid have excellent storage stability, and the resin formulation of Example 3, based on the components of Control Example B but having the diamine dispersed quickly as a solid and without dissolving, had good storage stability at room temperature.

The prepreg of this invention based on the storage stable epoxy matrix resin formulations set forth herein will thus be seen to clearly represent an improvement in storage stability over prior art prepreg.

The invention will thus be seen to be a prepreg having improved storage stability, said prepreg further described as a composition comprising a structural fiber embedded in a matrix resin formulation comprising an epoxy resin selected from the group consisting of polyglycidyl ethers of polycyclic bridged hydroxy-substituted polyaromatic compounds and N,N,N',N'-tetraglycidyl-bis(4-amino-3-ethylpheny) methane, as well as mixtures thereof, and solid aromatic diamine hardener dispersed therein. The epoxy formulation may be further characterized as comprising greater than 2 pbw, preferably greater than 3 and still more preferably from about 6 to about 150 pbw of a diamine hardener per 100 pbw of said epoxy resin. The preferred diamine hardener for use with the epoxy components disclosed is 3,3'-diaminodiphenyl sulfone. The prepreg will comprise from 20 to 80 wt % structural fibers, preferably selected from glass fibers, carbon fibers and aromatic polyamide fibers, and from 0 to about 25 wt % particulate modifier. The invention will also be seen directed to layered composites made from such prepreg.

The invention has been described and illustrated by way of specific embodiments set forth herein. Further modifications and variations will become apparent to those skilled in the resin formulating and composite fabricating art, and such variations and modifications will be included within the scope of the invention as defined by the appended claims.

We claim:

1. A composition comprising from about 20 to about 80 wt % continuous carbon fiber, said fiber embedded in a matrix epoxy resin comprising N,N,N',N'-tetraglycidyl-bis(4-amino-3-ethylphenyl) methane

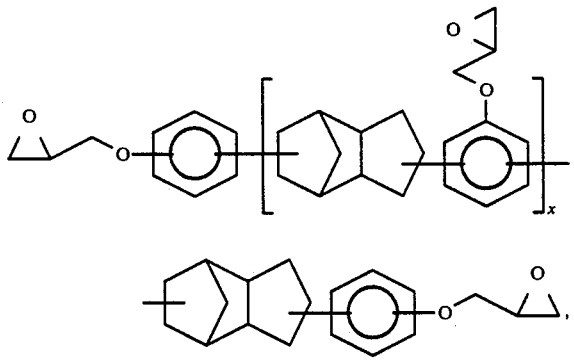

and from about 6 to about 150 pbw, per hundred parts by weight of the epoxy resin, of solid aromatic diamine hardener selected from the group consisting of 3,3'-diaminodiphenyl sulfone and 4,4'-bis(4-aminophenoxy) diphenyl sulfone dispersed as a finely divided solid in said epoxy resin at room temperature.

2. The composition of claim 1 wherein said epoxy resin is a mixture comprising N,N,N',N'-tetraglycidyl-bis(4-amino-3-ethylphenyl) methane and polyglycidyl ethers of polycyclic bridged hydroxy-substituted polyaromatic compounds having the structural formula:

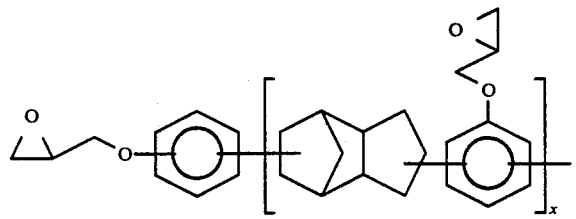

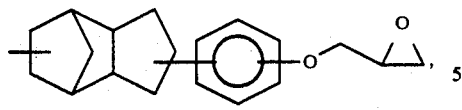

wherein x is an average value and lies in the range of from 0 to about 5.

3. The composition of claim 1 wherein said matrix resin further comprises from about 5 to about 30 pbw of a thermoplastic polymer selected from the group consisting of polyaryl ethers and polyether imides.

4. The composition of claim 1 wherein said matrix resin further comprises from 1 to about 25 wt % particulate modifier, based on combined weight of epoxy resin and diamine hardener to improve the toughness of the resultant composition.

5. A prepreg comprising from about 20 to about 80 wt % continuous carbon fiber unidirectional tape embedded in a matrix epoxy resin comprising N,N,N',N'-tetraglycidyl-bis(4-amino-3-ethylphenyl) methane; and from about 6 to about 150 pbw, per hundred parts by weight of the epoxy resin, of solid aromatic diamine hardener selected from the group consisting of 3,3'-diaminodiphenyl sulfone and 4,4'-bis(4-aminophenoxy) diphenyl sulfone dispersed as a finely divided solid in said epoxy resin at room temperature.

6. The prepreg of claim 5 wherein said epoxy resin is a mixture comprising N,N,N',N'-tetraglycidyl-bis(4-amino-3-ethylphenyl) methane and polyglycidyl ethers of polycyclic bridged hydroxy-substituted polyaromatic compounds having the structural formula:

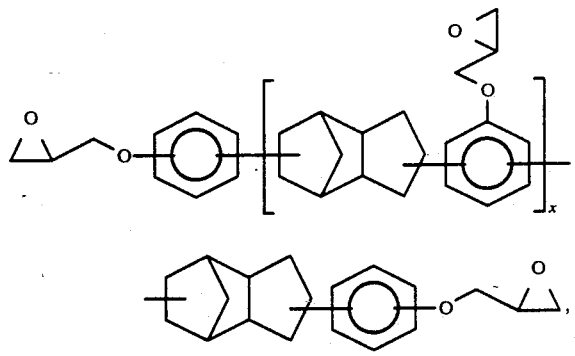

wherein x is an average value for the mixture and lies in the range of from 0 to about 5.

7. The prepreg of claim 5 wherein said matrix resin further comprises from about 5 to about 30 pbw of a thermoplastic polymer.

8. The prepreg of claim 7 wherein the thermoplastic polymer is selected from the group sonsisting of polyaryl ethers and polyether imides.

9. The prepreg of claim 5 having from 1 to about 25 wt % particulate modifier, based on combined weight of epoxy resin and diamine hardener, dispersed in matrix resin on at least one surface thereof, to improve the toughness of the resultant composition.

* * * * *